United States Patent [19]
Van der Lely et al.

[11] 3,848,677
[45] Nov. 19, 1974

[54] SOIL CULTIVATING IMPLEMENTS AND SCREENING ELEMENTS

[76] Inventors: Ary Van der Lely, 10, Weverskade, Maasland; Cornelis Johannes Gerardus Bom, 36, Esdoornlaan, Rozenburg, both of Netherlands

[22] Filed: May 17, 1973

[21] Appl. No.: 361,292

[30] Foreign Application Priority Data
May 24, 1972 Netherlands.................... 7206943

[52] U.S. Cl............................... 172/112, 172/509
[51] Int. Cl........................................... A01b 33/06
[58] Field of Search....... 172/59, 81, 111, 112, 113, 172/508, 509, 511, 513, 99; 56/17.4, 320.1, 320.2; 37/43 K, 43 L

[56] References Cited
UNITED STATES PATENTS
| | | | |
|---|---|---|---|
| 1,000,961 | 8/1911 | Berven................................. | 172/509 |
| 3,616,862 | 11/1971 | Van der Lely..................... | 172/59 X |
| 3,774,689 | 11/1973 | Van der Lely et al.............. | 172/112 |

FOREIGN PATENTS OR APPLICATIONS
1,940,993  12/1970  Germany............................ 172/509

Primary Examiner—Robert E. Pulfrey
Assistant Examiner—Paul T. Sewell
Attorney, Agent, or Firm—Mason, Mason & Albright

[57] ABSTRACT

A cultivating implement has tined soil working members mounted side-by-side in a row. A screening plate element is pivotably mounted adjacent at least one side of the implement to deflect debris thrown by the soil working members. Each screening element being mounted to pivot at its forward end about a vertical rod in a sleeve secured to the implement's frame. The rod is attached to the screen together with a second and third rod which are arranged in U-shaped configuration. The screening element is slideable and vertically adjustable in the sleeve and rides on the ground with a rim. A spring on the sleeve biases the screening element against the frame's side so that the element returns to extend in the direction of travel once debris is dislodged from between the frame and the element.

15 Claims, 3 Drawing Figures

SOIL CULTIVATING IMPLEMENTS AND SCREENING ELEMENTS

According to the invention, there is provided a soil cultivating implement of the kind set forth, wherein the screen is arranged so as to be pivotable about an axis which is not parallel to the intended direction of operative travel of the implement.

Figure 1:
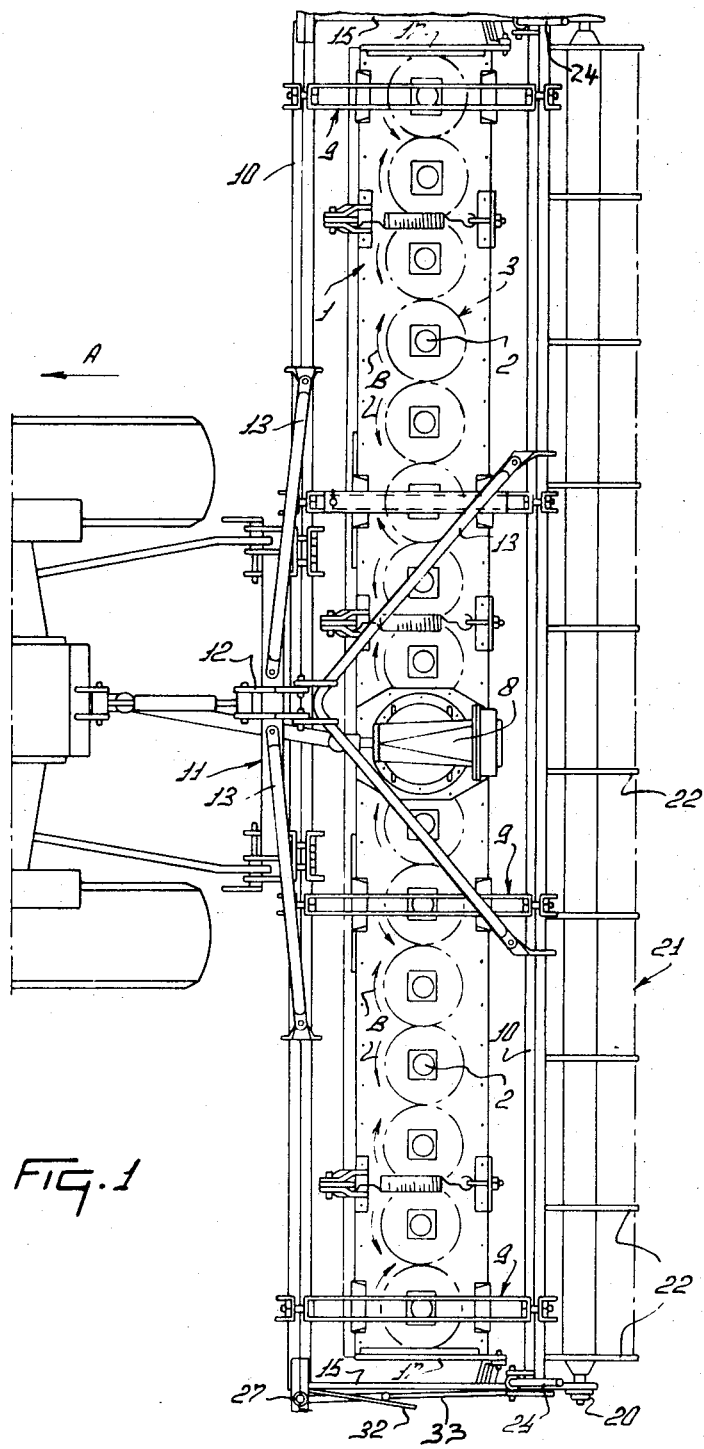
Figure 2:
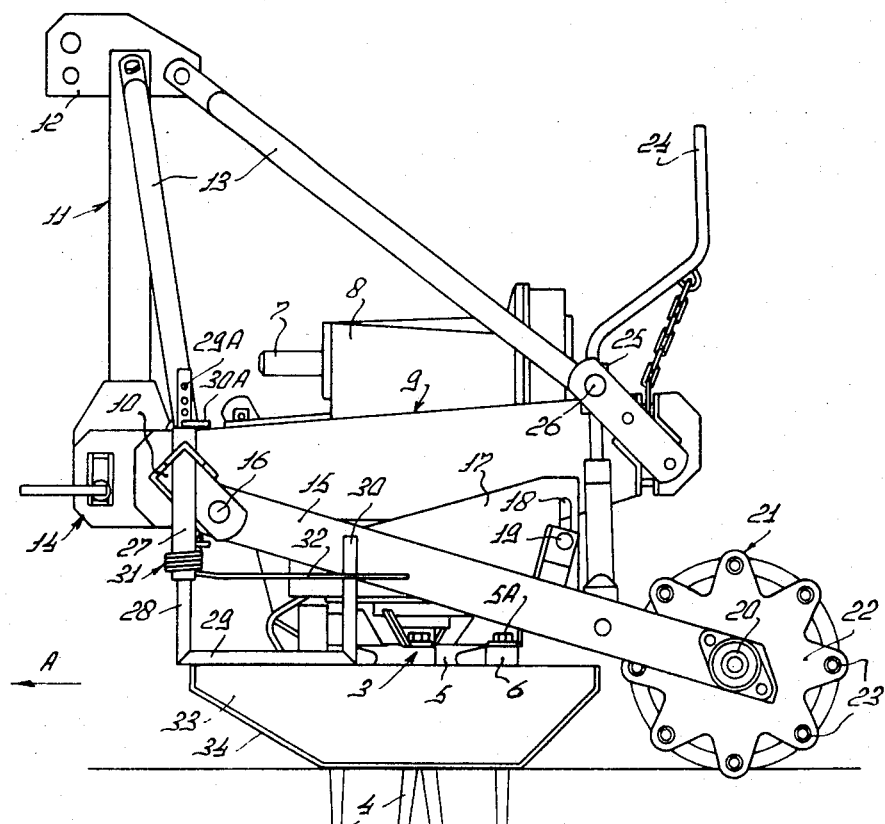
Figure 3:
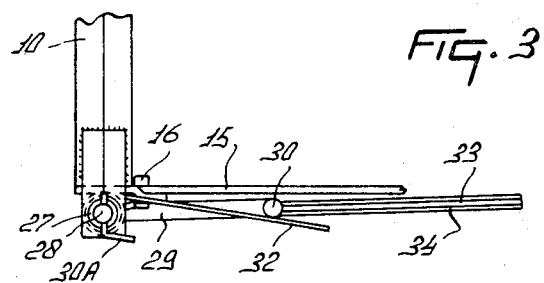

For a better understanding of the invention, and to show how the same may be carried into effect, reference will now be made, by way of example, to the accompanying drawings, in which:

FIG. 1 is a plan view of a rotary harrow in accordance with the invention coupled to the rear of an agricultural tractor, FIG. 2 is a side elevation of the harrow of FIG. 1 to an enlarged scale, and FIG. 3 is a scrap plan view to the same scale as FIG. 2 illustrating the construction and arrangement of parts located at one lateral end of the harrow in greater detail.

Referring to the drawings, the rotary harrow that is illustrated comprises a hollow box-shaped frame portion 1 that extends substantially horizontally perpendicular to the intended direction of operative travel of the harrow that is indicated by an arrow A in FIGS. 1 and 2 of the drawings. The frame portion 1 supports a single row of a plurality (in this case 16 ) of upwardly extending substantially vertical shafts 2 that are spaced apart from one another at regular intervals of substantially 25 centimeters. The lowermost ends of the shafts 2 project from beneath the frame portion 1 and are there provided with corresponding soil working members or rotors that are generally indicated by the reference numeral 3. Each rotor 3 comprises a substantially horizontally extending tine support 5 whose center is fixed to the lower end of the corresponding shaft 2, a pair of substantially vertically disposed sleeve-like tine holders 6 secured to the opposite ends of the support 5 and a pair of tines 4 having upper fastening portions 5A that are firmly, but releasably, housed in the two holders 6. As previously mentioned, there are sixteen shafts 2 in this embodiment and thus sixteen of the soil working members or rotors 3 that are arranged in a single substantially horizontal row that extends substantially perpendicular to the direction A. With this construction, the harrow has a working width of between substantially 4 and substantially 4½ meters but it is emphasised that the provision of 16 soil working members or rotors 3 is by no means essential and that the invention is equally applicable to harrows having a different number of such parts.

As seen in plan view, the two tines 4 of each soil working member or rotor 3 have lower soil working portions that project outwardly to a small extent with respect to the fastening portions 5A thereof and the corresponding shaft 2. Moreover, the lower soil working portions of the tines 4 normally occupy rearwardly inclined trailing positions with respect to the intended directions of rotation of the soil working members or rotors 3 that are indicated by arrows B in FIG. 1 of the drawings. The distance between the two fastening portions 5A of the two tines 4 that correspond to a single soil working member or rotor 3 is preferably also substantially 25 centimeters but, due to the slight downward and outward divergence of the soil working portions of the tines 4, the strips of soil worked by individual members or rotors 3 overlap each other to a small but sufficient extent to produce a single broad strip of worked soil.

The shafts 2 are provided inside the hollow frame portion 1 with corresponding straight- or spur-toothed pinions as indicated in broken lines in FIG. 1 of the drawings and these pinions co-operate with one another in such a way that the teeth of any one pinion are in mesh with those of its neighbour, or both of its neighbours, in the row. One of the central pair of shafts 2 of the row has an upward extension into a gear box 8 that is mounted on top of the frame portion 1 and said extension is driven, during the use of the harrow, to rotate the soil working members or rotors 3 from a rotary input shaft 7 of the gear box 8 that projects forwardly therefrom in substantially the direction A and whose leading splined or otherwise keyed end is placed in driven connection with the power take-off shaft of an operating tractor or other vehicle by way of a telescopic transmission shaft of a construction that is known *per se* having universal joints at its opposite ends. It is preferred that the rear of the gear box 8 should be provided with a change-speed gear, as illustrated, having pinions that can be interchanged to produce different speeds of rotation of the soil working members or rotors 3 in response to a single input speed of rotation of the shaft 7. This enable speeds of movement of the tines 4 through the soil to be chosen that are most appropriate to any particular working conditions but no further details of the change-speed gear will be given here since that gear does not form the subject of the present invention.

The top of the frame portion 1 is secured to four supports 9 that all extend substantially parallel to the direction A and that are horizontally spaced apart from one another at regular intervals. The supports 9 project beyond the front and rear of the frame portion 1 in directions parallel to the direction A and the opposite front and rear ends of said supports clampingly embrace two rigid beams 10 of square or rectangular cross-section that both extend substantially horizontally perpendicular to the direction A in parallel relationship with the frame portion 1. It will be evident that one of the beams 10 precedes the frame portion 1 with respect to the direction A while the other is located behind said frame portion, a reason for the provision of the supports 9 and beams 10 being to increase the resistance to bending deformation of the frame portion 1. A generally triangular coupling member 11 is positioned substantially centrally of the harrow just in front of the leading beam 10 and is rigidly connected to both beams 10 by parts that include tubular beams 13 that extend downwardly in divergent relationship from locations adjacent a pair of vertical coupling plates 12 disposed at the apex of the coupling member 11 in close horizontally spaced apart relationship. Pairs of vertical coupling plates 14 at the foot of the coupling member 11 are directly connected to the leading substantially horizontal beam 10.

The opposite lateral ends of the frame portion 1 have two arms 15 arranged immediately beyond them, said arms 15 being turnable about a substantially horizontal axis that extends parallel to the two beams 10 and that is afforded by substantially aligned pivot pins 16 disposed just below, and just behind with respect to the direction A, the foremost of the two beams 10. Each arm 15 is movable upwardly and downwardly, about the corresponding pivot pin 16, near to a corresponding substantially vertical and generally sector-shaped plate 17 that is rigidly mounted at the corresponding lateral end of the frame portion 1 in such a way that its larger upright edge is rearmost with respect to the direction A. Each plate 17 is formed adjacent its rearmost edge with a curved slot 18 whose center of curvature coincides with the axis defined by the pivot pins 16. Each arm 15 carries a projecting bracket which, in turn, supports a guide rod, guide pin or the like 19 that is entered through the neighbouring slot 18. The lowermost and rearmost end of each arm 15 carries a corresponding substantially horizontal bearing 20 which receives a stub shaft at one end of a rotary supporting member 21 in the general form of a soilcompressing ground roller. The rotary supporting member or roller 21 comprises a plurality, such as 10, of regularly spaced apart substantially vertial supporting plates 22 that each extend substantially parallel to the direction A, the peripheries of said plates 22 being interconnected by a plurality, such as eight, of elongated tubular elements 23 that are preferably wound helically around the longitudinal axis of the member 21, as illustrated, but that could alternatively extend substantially parallel to that axis.

Each arm 15 is pivotally connected to one end of a corresponding screw-threaded spindle assembly 24 whose length can be varied by rotating a cranked handle at the upper end thereof in a corresponding block 25 relative to which said handle is turnable but substantially axially immovable, the block 25 being pivotable about the axis of trunnion pins 26. The axis which has just been mentioned extends parallel to the two beams 10 and said trunnion pins 26 occupy fixed positions, except as regards angular displacement about their own axes, relative to the rearward beam 10. It will be apparent that rotation of the handles of the assemblies 24 will turn the arms 15 either upwardly or downwardly about the pivot pins 16 thus raising or lowering the level of the axis of rotation of the rotary supporting member 21 relative to that of the remainder of the harrow. The vertical level of the supporting member 21 with respect to the remainder of the harrow is the principal factor which determines the depth of penetration of the tines 4 into the soil during a harrowing operation. In order that a chosen fixed position of the rotary supporting member 21 relative to the frame portion 1 should not rely solely upon the strength of the parts from which the assemblies 24, blocks 25, trunnion pins 26 and so on are formed, positive locking means that are not shown in the drawings may be provided that can be engaged to fix the angular positions of the arms 15 rigidly about the axes of the pivot pins 16 once the lengths of the spindle assemblies 24 have been adjusted as may be required. The provision of such positive locking means, although not absolutely essential, is desirable in view of the considerable weight of the rotary supporting member or roller 21.

Substantially vertical bearing sleeves or bushes 27 are rigidly connected to the opposite ends of the leading beam 10 so as to lie immediately beyond those ends and thus close to the two soil working members or rotors 3 that are located at the opposite ends of the single row thereof. The axes defined by the bushes 27 extend parallel to the axes of rotation of the shafts 2 and they accommodate corresponding substantially vertical rods 28 that are both angularly and axially displaceable therein. As seen in side elevation (FIG. 2), the perpendicular distance between the longitudinal axis of each rod 28 and a plane containing the axes of rotation of the shafts 2 is substantially equal to the total length of one of the tines 4, the rods 28 being located in front of the imaginary plane which contains the axes of rotation of the row of shafts 2 with respect to the direction A. Each rod 28 is formed with a row of transverse holes 29A and a horizontal locking pin 30A, or equivalent bolt, can be entered through a chosen hole 29A in each row so as normally to bear against the upper end of the corresponding bush 27 and prevent the corresponding rod 28 from moving axially downwards through the bush 27 beyond the axial position dictated by the chosen hole 29A. The lowermost end of each rod 28 has a further rod 29 rigidly secured thereto in such a way that the axes of the two rods 28 and 29 are perpendicular to one another, the rods 29 normally extending rearwardly from the rods 28 in directions substantially parallel to the direction A. Each rod 29 has a length which is substantially equal to that of the lower soil working portion of one of the tines 4. The normally rearmost end of each rod 29 has a third rod 30 rigidly secured to it in such a way as to extend substantially vertically upward from the rod 29 in perpendicular relationship with that rod and parallel relationship with the corresponding rod 28. In the embodiment which is illustrated in the accompanying drawings, the rods 30 are substantially equal in length to the rods 29 but their lengths should always be such that, as seen in side elevation, the uppermost ends of the rods 30 are never below the lowermost edges of the arms 15 whatever the settings of the spindle assemblies 24 and the axial settings of the rods 28 in the sleevers or bushes 27.

Each bearing bush 27 is surrounded adjacent its lower end by the convolutions of a corresponding coil spring 31 one end of which is anchored to the outer surface of the bush 27. The opposite end of each spring 31 takes the form of a substantially rectilinear projecting portion 32 that normally extends rearwardly away from its bush 27 with respect to the direction A in a direction that, as seen in plan view (FIG. 3), is substantially, but not exactly, inclined at 90° to the length of the leading beam 10. The spring portion 32 abuts against the side of the corresponding rod 30 that is remote from the neighbouring arm 15 but the construction and arrangement of the springs 31 are such that, when they occupy positions corresponding to those illustrated for one of them in FIGS. 2 and 3 of the drawings, the portions 32 bear against the rods 30 with no appreciable force. Thus, the rods 30 (which are turnable about the longitudinal axes of the rods 28) are clear of contact with the arms 15. The lower surface of each rod 29 has a corresponding substantially vertical plate 33 rigidly secured to it in such a way that the general planes of the plates 33 are coincident with, or at least parallel to, substantially vertical planes that contain the longitudinal axes of the corresponding rods 29. The plates 33 are thus substantially vertically disposed and, during normal operation of the harrow, they both extend substantially perpendicular to the lengths of the beams 10 as seen in plan view and parallel to the direction A. Under such normal working conditions, each plate 33 has a length in the direction A that is substantially equal to the perpendicular distance between the two beams 10. Each plate 33 is provided along its leading, lowermost and rearmost edges, with respect to the direction A, with a relatively perpendicular rim or flange 34 which is so arranged that a portion thereof along the lowermost edge of the plate 33 is substantially horizontally parallel to the corresponding rod 29 whereas portions thereof that are located at the relatively opposite ends of the substantially horizontal portion are both inclined upwardly.

In the use of the rotary harrow that has been described, its coupling member 11 is connected to the three-point lifting device or hitch of an agricultural tractor or other operating vehicle in the manner that is shown in outline in FIG. 1 of the drawings and the rotary input shaft 7 of the gear box 8 is placed in driven connection with the power take-off shaft of the same tractor or other operating vehicle by way of the aforementioned telescopic transmission shaft of known construction having universal joints at its opposite ends. As the harrow moves over a field whose soil is to be worked, the members or rotors 3 are rotated in the directions indicated by he arrows B in FIG. 1 of the drawings, the arrangement being such that the two soil working members or rotors 3 that are located at the opposite ends of the single row thereof both rotate in directions B in which the tines 4 move forwardly past the neighbouring arms 15 and plates 33 with respect to the direction A when in the positions in which those tines approach closest to said arms and plates. The plates 33, which act as screening plates, normally occupy substantially the positions thereof that are shown in the drawings during the operation of the harrow in which positions they are disposed substantially parallel to the direction A. As previously mentioned, the effective working depth of the tines 4 is selected by appropriate upward or downward adjustment of the rotary supporting member 21 relative to the frame portion 1, the positive locking means that are preferably provided being engaged after an adjustment has been made to maintain that adjustment without exerting deforming forces on the parts 24 to 26. The plates 33 and their rims or flanges 34 prevent excessive crumling of the worked soil in marginal regions of the broad strip of worked ground and thus contribute to the formation of anuniformly crumbled seed bed. The plates 33 effectively cooperate with the soil working portions of the tines 4 of the members or rotors 3 that are at the opposite ends of the single row thereof and it will be noted that the vertical settings of the plates 33 can be adjusted to correspond to the depth setting of the tines 4 that has been produced by adjustment of the rotary supporting member 21 by engaging the pins 30A or equivalent bolts in appropriate transverse holes 29A of the rods 28. The locking pins 30A or equivalent bolts can be entirely removed in which case the rods 28 can move freely upwards and downwards in the bushes 27 to match undulations in the surface of the soil over which the harrow is travelling and such an arrangement is suitable for some operating conditions. When the locking pins 30A or equivalent bolts are inserted in chosen holes 29A, those pins or bolts prevent the rods 28 from moving downwardly beyond the positions in which the pins or bolts bear against the upper ends of the sleeves or bushes 27.

The plates 33 also serve as screens or guards against stones and other hard objects which might otherwise be flung laterally of the harrow by the rapidly rotating tines 4. Each plate 33 can turn, together with the associated rods 29 and 30, about the vertical or at least upright longitudinal axis of the corresponding rod 28 and it will be seen from the drawings that each plate 33 can, in fact, turn inwardly through a very small angle towards the neighbouring soil working member or rotor 3 and the intervening arm 15 in an unrestrained manner until the rod 30 meets the corresponding arm 15 which latter thus constitutes a stop. If, during operation, a stone, piece of metal or some other loose but uncrushable object should find its way between the tines 4 of one of the end soil working members or rotors 3 of the row and the neighbouring plate 33, then the rotational movement of the affected tine 4 will turn that plate 33 outwardly, against the action of the associated spring 31, about the axis of the corresponding rod 28 through the intermediary of the intervening stone or other offending object. The plate 33 will yield without damage to itself or to the neighbouring soil working member or rod 3 and the moving tines 4 will push the stone or the like out of the way without that stone or the like, it is emphasised, being flung laterally of the harrow at a dangerous speed. Once the stone or other obstacle has been displaced, the rectilinear portion 32 of the affected spring 31 will bring the plate 33 and the rods 29 and 30 to which it is connected back to substantially the normal operating position thereof that is shown in the drawings. In this position, the plate 33 is freely turnable through a very few degrees about the axis of the corresponding rod 28 between the position in which the corresponding rod 30 bears against the spring portion 32 and the position in which it bears against the neighbouring arm 15.

The screens at the opposite ends of the row of soil working members or rotors 3 have been described as being afforded by the plates 33 and their perpendicular rims or flanges 34. However, it is emphasised that it is by no means essential that the screens should have the form which has previously been described and which is illustrated in the drawings and that they may have any other form which will enable them to serve their appointed functions. For example, the screens may be formed wholly or partly from metallic sheets, wholly or partly from synthetic resins or other synthetic plastic materials and/or may be formed wholly or partly from materials that are strip-shaped. It is also pointed out that, while the invention has been described in its application to a rotary harrow having a plurality of soil working members or rotors that revolve about upright axes, the invention could also be applied to a harrow or like soil working implement having soil working members that are driven so as to oscillate or make other soil-displacing movements that are not strictly rotary motion.

While various features of the rotary harrow that has been described and/or illustrated in the accompanying drawings will be set forth in the following claims as inventive features, it is emphasised that the invention is not necessarily limited to those features and that it includes within its scope all of the parts of the rotary harrow that has been described and/or illustrated both individually and in various combinations.

What we claim:

1. A soil-working cultivating implement comprising a frame and a plurality of soil-working members rotatably mounted on said frame, said soil-working members being mounted on upwardly extending shafts located in a transverse row and driving means on said implement being connected to rotate said shafts, a platelike screening element being pivotably mounted on said frame adjacent each end of said row, said element having a forward end pivoted to said frame and being turnable about an axis that extends substantially parallel to said shafts, a spring associated with said element and said spring biasing said element to turn same towards said soil-working members, against a stop on said implement, whereby the turning movement of said screening element about said axis is limited.

2. An implement as claimed in claim 1, wherein said screening element has means for adjustment thereof in a direction substantially parallel to said axis.

3. An implement as claimed in claim 1, wherein the axis about which said screening element is pivotable is located in front of a plane containing said shafts and the axes of rotation of said soil-working members with respect to the normal direction of travel.

4. An implement as claimed in claim 3, wherein said soil-working members each have tines and the perpendicular distance between said axis and said plane is substantially equal to the total length of one tine of one of said rotary soilworking members.

5. An implement as claimed in claim 1, wherein the axis about which said screening element is turnable is defined by a rod, said rod being secured to said screening element and being turnable in bearing sleeve attached to said frame.

6. An implement as claimed in claim 5, wherein said spring is associated with the screening element to exert a minimum of force upon said element when the latter extends substantially parallel to the direction of travel.

7. An implement as claimed in claim 5, wherein a roller is connected to trail at the rear of said soil-working members, said roller being connected to said frame with arms and said arms having adjustment means that raise and lower said frame to regulate the working depth of said soil-working members, said stop being comprised by one of said arms.

8. An implement as claimed in claim 7, wherein a second rod is secured to the lowermost end of said first mentioned rod, said second rod normally extending rearwardly therefrom with respect to the direction of travel and being secured to said screening element.

9. An implement as claimed in claim 8, wherein an upwardly extending abutment rod is attached to said second rod to accupy a fixed position, relative to said screening element, said abutment rod being positioned to cooperate with said stop.

10. An implement as claimed in claim 9, wherein said spring includes convolutions that surround said bearing sleeve for said rod.

11. An implement as claimed in claim 9, wherein at least a portion of said spring normally contacts said upwardly extending abutment rod.

12. An implement as claimed in claim 11, wherein said portion of the spring normally contacts that side of the abutment rod remote from said row of soil-working members.

13. An implement as claimed in claim 5, wherein said bearing sleeve is secured to one end of said frame.

14. An implement as claimed in claim 5, wherein said rod is vertically slideable in said bearing sleeve and has a plurality of transverse holes that receive a locking pin, whereby said pin is insertable in any selected one of said holes to bear against an upper end of said sleeve and restrict the vertical movements of the screening element.

15. An implement as claimed in claim 1, wherein said screening element is freely displaceable to a predetermined extent in an upward direction.

* * * * *